May 20, 1941.  M. E. MOREAU  2,242,590
LIGHT REFLECTOR
Filed Aug. 4, 1939    2 Sheets-Sheet 1
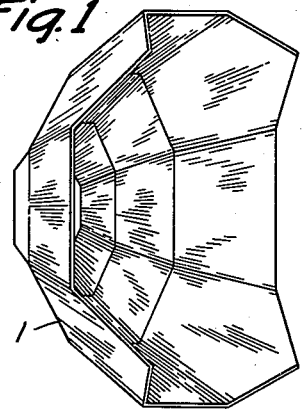
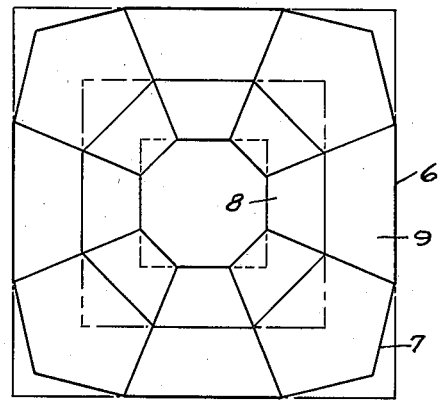
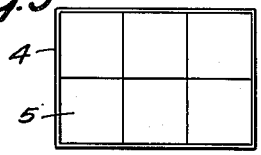
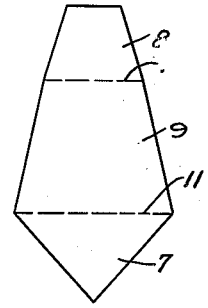
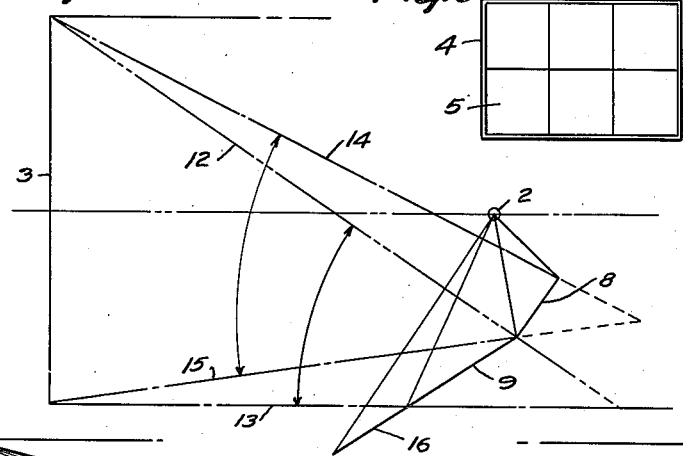
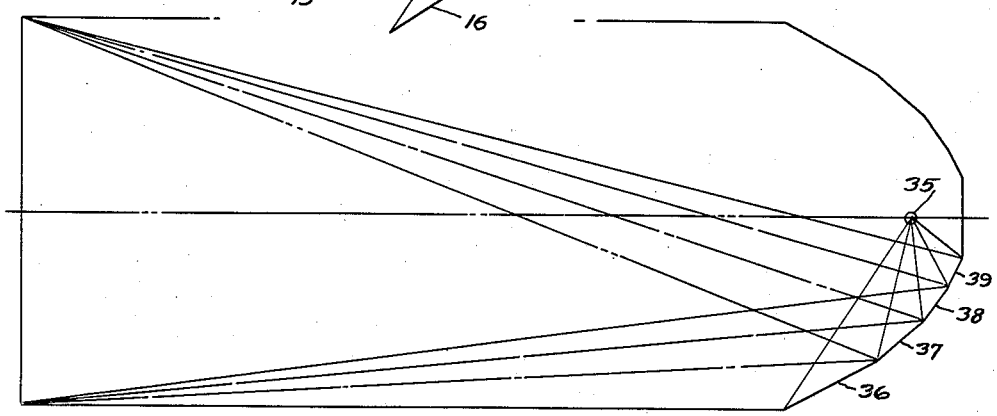
INVENTOR.
Marcel Eloi Moreau
BY James Harrison Bowen
ATTORNEY.

May 20, 1941.  M. E. MOREAU  2,242,590
LIGHT REFLECTOR
Filed Aug. 4, 1939  2 Sheets-Sheet 2
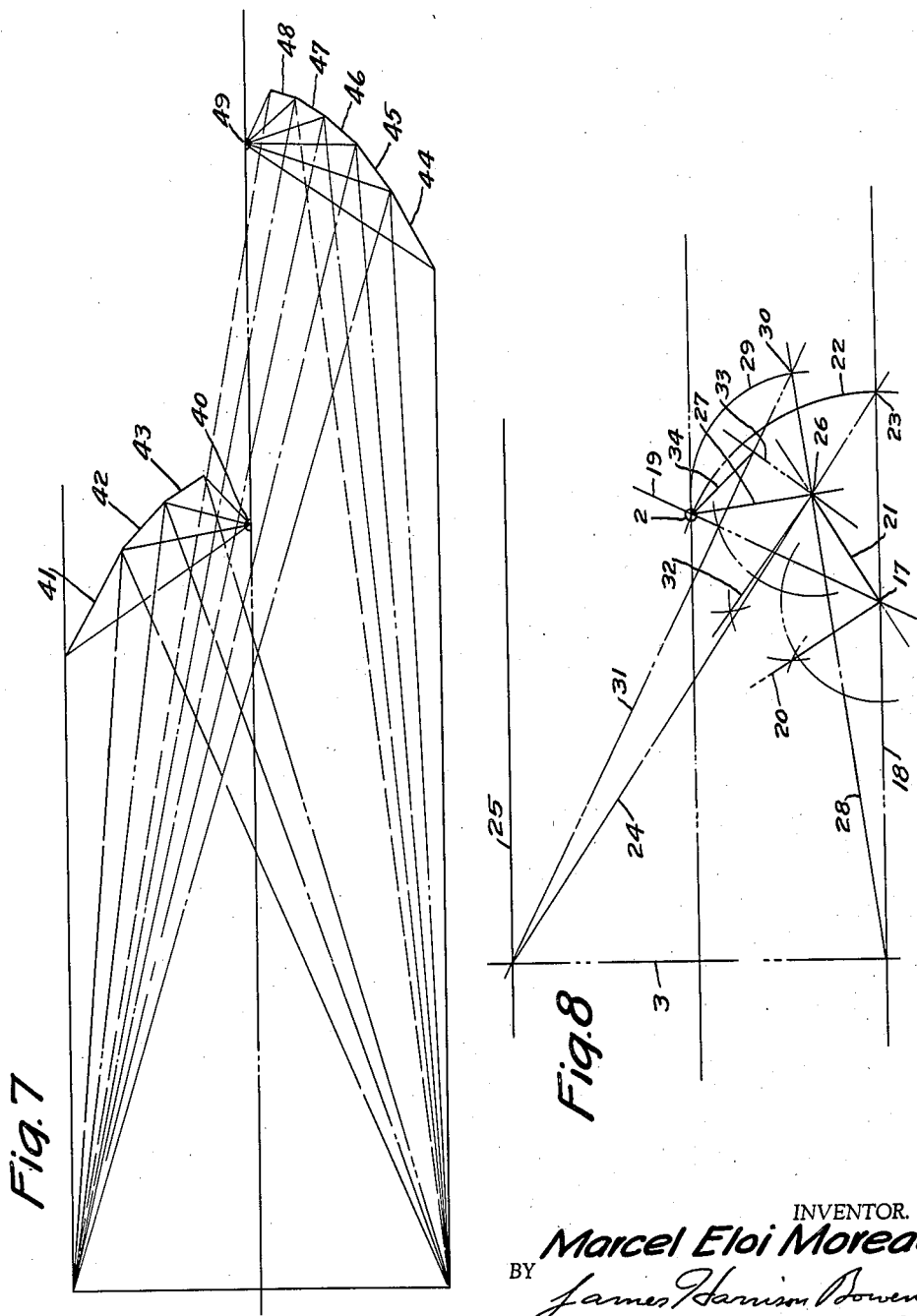
INVENTOR.
Marcel Eloi Moreau
BY
ATTORNEY.

Patented May 20, 1941

2,242,590

UNITED STATES PATENT OFFICE 2,242,590

LIGHT REFLECTOR

Marcel Eloi Moreau, New York, N. Y.

Application August 4, 1939, Serial No. 288,430

2 Claims. (Cl. 240—41.36)

The purpose of this invention is to provide a concentrating reflector particularly adapted for illuminating signs, with each reflector and its light source covering a definite area of the sign.

The invention is a reflector preferably having a square peripheral shape, with a plurality of reflecting surfaces, each of which is calculated to reflect all rays of light harnessed thereby to a definite area on a surface a definite distance from the reflector and light source, with light rays of all of the individual reflecting surfaces of one reflector directed toward the same area.

The invention is an improvement over the device of my prior patent, No. 1,424,932, in that, instead of harnessing rays of light from the sun or an external source, the relatively large number of reflecting surfaces or facets are positioned to reflect rays of a light source positioned in the reflector toward a definite area positioned a definite distance from the light source and reflector.

Many devices have been provided for efficiently reflecting rays of light and particularly the glare rays of an automobile head-light, however it is desirable for certain purposes to illuminate a given area on a plate or front of a container or sign box, and, therefore, this device provides a plurality of individual reflecting surfaces in which all of the rays of light from each surface are projected so that they will intermingle and cross and all be reflected to cover a certain area a certain distance from the reflector and light source.

The object of this invention is, therefore, to position a plurality of reflectors about a light source so that each reflector will harness rays of light from the light source and definitely reflect them to completely cover a prescribed area.

Another object is to provide a reflector having a plurality of reflecting surfaces for reflecting rays of light to a given area which may be formed of an integral unit, or of a plurality of individual units.

Another object is to provide a method of constructing a reflector having a plurality of reflecting surfaces positioned about a light source so that the respective angles of all of the reflecting surfaces will direct rays of light to cover an area such as a square.

A further object is to provide a reflector for signs and the like in which a plurality of reflectors, each having an individual light source, may be combined as a unit, with each unit lighting an area of a surface.

A still further object is to provide a reflector having a plurality of individual units in which the distance of the reflector and light source from the surface to be illuminated is in proportion to the number of reflecting surfaces on radial axes from the light source.

And a still further object is to provide a reflector having a plurality of individual reflecting surfaces for directing all rays of light from a light source therein to a given area which is of a relatively simple and economical construction.

With these ends in view the invention embodies a reflector or a plurality of reflectors each having a plurality of reflecting surfaces, and all of said reflectors adapted to be positioned in a group, with each having a light source and each adapted to reflect rays of light of the light source to a definite area of a surface to be illuminated.

Other features and advantages of the invention will appear from the following description taken in connection with the drawings, wherein:

Figure 1 is a view illustrating a perspective view of the reflector.

Figure 2 shows a direct front elevation with the parts diagrammatically shown.

Figure 3 illustrates a front elevation of a box or sign adapted to be illuminated by a plurality of reflectors of the type described herein.

Figure 4 is a detail showing one section of the reflector illustrated in Figure 2.

The remaining figures are diagrams illustrating reflectors with different numbers of reflecting surfaces or devices of different lengths.

Figure 5 is a relatively short reflector in which two reflecting surfaces are used in each unit.

Figure 6 is a similar reflector showing four reflecting surfaces in each unit.

Figure 7 illustrates a reflector having three reflecting surfaces above the center line, and a similar reflector having five reflecting surfaces below the center line.

Figure 8 is a detail illustrating a method of computing the angles of the reflecting surfaces.

In the drawings the device is shown as it may be made, wherein numeral 1 indicates the reflector unit, numeral 2, a light source which may be an electric bulb or any suitable means of providing light, and numeral 3, a surface upon which the light rays are projected.

The reflector 1 is formed of a plurality of individual reflecting surfaces radially positioned about the light source 2, and each individual surface is positioned to reflect rays of light striking said surface over an area, as indicated by the numeral 3, with the type shown in Figure 5.

A plurality of these reflectors may be positioned in a group which, in the device shown in Figure 3 and indicated by the numeral 4, would contain six areas 5 with a reflector and a light behind each area, and all of the rays of light from the reflector would be reflected upon the from the reflector would be reflected upon the individual square behind which the reflector is positioned. It will be understood, however, that only one reflector may be used, or any number of reflectors may be provided in a group, and these may be arranged to form any design.

The reflector, in the design shown, is formed of eight segments, with the vertical and horizontal segments having straight outer edges 6, and with the diagonal segments having extending points 7, and it will be noted that these points stop short of the corners only extending a sufficient distance to reflect rays of light over the respective corners of the surface.

These segments are formed with inner sections 8 and intermediate sections 9, and the edges are shaped as illustrated in Figure 4 so that, when the parts are bent on the lines 10 and 11, the edges will correspond with the adjoining segments forming a complete unit. These edges may be soldered together or secured in any manner, or the entire unit may be stamped as may be desired.

Figures 2 and 5 illustrate a segment of a reflector having only two reflecting surfaces 8 and 9, and it will be noted that the surface 9 reflects all rays of light from the light 2 between the lines 12 and 13, thereby completely covering the area 3, and the surface 8 reflects all rays of light from the light 2 between the lines 14 and 15 also completely covering the area 3, and it will be noted that, with a plurality of these parts positioned about a center or light source, all rays of light from all of the reflecting surfaces will be directed to cover the surface 3, and, therefore, all rays from the light 2 will be harnessed and reflected so that they will cover the same area.

Figure 5 also illustrates an extending point 16 corresponding to the point 7, and this portion is designed to reflect all rays of light toward the corners, thereby completely covering the square or area, and it will be noted that the points 7 only extend downward sufficiently to provide rays of light on the diagonal radial lines in order to cover the corners of the unit.

Reflectors illustrated in the drawings are designed particularly to cover an area three inches square, and with the light source three and one-half inches from the plate 3 only two reflecting surfaces 8 and 9 are required, whereas, with the light six inches from the surface 3, three reflecting surfaces are required as illustrated in the upper part of Figure 7, and with the light source seven inches from the surface 3, four reflecting surfaces are required, and, with the light nine inches from the surface, five reflecting surfaces are required. It is understood that these dimensions are only given for the purpose of illustration, and it is not desired to limit the invention to any particular size.

These surfaces are computed as illustrated in Figure 8, in which a line 3 indicates the surface 3, the dot 2 the light source, and, for the purpose of illustration, the light source is positioned three and one-half inches from the line 3, and a point 17 is taken on a line 18 perpendicular to the line 3, and from the point 17 a line 19 is drawn through the light 2, and the angle between the lines 18 and 19 bisected as illustrated by the line 20, and then a line 21 drawn perpendicular to the line 20, which, obviously, is the angle required to reflect a ray of light from the line 19 along the line 18.

With the point 17 as a center, an arc 22 is drawn intersecting the light 2 and the line 18 at the point 23, and from this point a line 24 is drawn through the point where a line 25, indicating the upper boundary of the area on the line 3, intersects the line 3, and where the line 24 intersects the line 21 is a point 26 indicating the opposite end of the reflecting surface 21, and, obviously, all rays of light between the lines 27 and 19 striking the surface 21 will be reflected over the area 3, with the lines 18 and 24 forming the boundaries.

A line 28 is then drawn from the lower end of the line 3 through the point 26, and, with the point 26 as a center, an arc 29 is described intersecting the line 28 at the point 30, and from the point 30 a line 31 is drawn to the upper end of the line 3, providing the upper limit of the next reflecting surface. This reflecting surface is determined by bisecting the angle between the lines 27 and 28, as indicated by the line 32, and then drawing the line 33 perpendicular to the line 32, and all rays of light striking the reflecting surface 33 between a line 34 from the lamp 2 and the line 27 will be reflected upon the area 3, with the lines 28 and 31 forming boundaries. This same process may be continued describing as many reflecting surfaces as may be desired, and it will be noted that the further the light 2 is positioned from the surface 3 the smaller the reflecting surfaces, with the area of the surface 3 remaining constant.

In the design shown in Figure 6, with the light source located at the point 35, and with the reflecting surfaces described as illustrated in Figure 8, the reflector will have four reflecting surfaces 36, 37, 38, and 39, and, with the light positioned at the point 40 in the part of the reflector illustrated in the upper half of Figure 7, each segment of the reflector will have reflecting surfaces 41, 42, and 43, with the reflector illustrated in the lower part of the figure having reflecting surfaces 44, 45, 46, 47, and 48, with a light positioned at the point 49.

It will be understood, therefore, that any number of reflecting surfaces may be provided in each section of the reflector, and these are dependent upon the distance between the light source and the area to be illuminated.

It will be understood that other changes may be made in the device without departing from the spirit of the invention. One of which changes may be in the use of a reflector of this type having any number of sections or segments instead of the eight as illustrated in Figure 2, another may be in the use of a reflector of this type of any size and of any desired peripheral shape, and still another may be in the use of reflecting surfaces of this type for any purpose.

The construction will be readily understood from the foregoing description. In use reflectors of this type may be provided, and these may be positioned with lamps therein and used independently, or a plurality may be used to illuminate a sign, as illustrated in Figure 3, and any number may be used for one sign. It will also be understood that the sign may be divided into compartments, as illustrated in Figure 3, or the lines dividing the front of the sign into sections may be omitted so that the rays of one section may overlap those of another, guaranteeing complete illumination.

It will be understood that, although this device has been illustrated and described as particularly adapted for signs, it may be used for illuminating other devices, and may also be used for lamps as in photography or wherever a defined light area may be desired.

Having thus fully described the invention, what I claim as new, and desire to secure by Letters Patent, is:

1. A light reflector comprising a plurality of radial sectors positioned about a light source with the periphery thereof substantially forming a square, cut off slightly at the corners, each sector comprising a plurality of independent flat surfaces, and characterized in that the angular position of each flat surface of each sector is positioned in relation to the light source, to reflect all rays of light therefrom upon an area, and all flat surfaces of all sectors reflect the rays of light upon the same area.

2. A reflector as described in claim 1, in which the number of individual reflecting surfaces is in proportion to the distance the area upon which the light rays are reflected is from the reflector.

MARCEL ELOI MOREAU.